United States Patent [19]

Garcia Tinoco

[11] Patent Number: 5,577,589
[45] Date of Patent: Nov. 26, 1996

[54] DOCUMENT HANDLER

[76] Inventor: Jaime G. Garcia Tinoco, 14, Chemin Myosotis, 1214 Vernier, Geneva, Switzerland

[21] Appl. No.: 284,643

[22] PCT Filed: Dec. 16, 1993

[86] PCT No.: PCT/EP93/03577

§ 371 Date: Sep. 30, 1994

§ 102(e) Date: Sep. 30, 1994

[87] PCT Pub. No.: WO94/14141

PCT Pub. Date: Jun. 23, 1994

[30] Foreign Application Priority Data

Dec. 17, 1992 [EP] European Pat. Off. ............ 92121430
Sep. 30, 1993 [EP] European Pat. Off. ............ 93307789

[51] Int. Cl.$^6$ .................. G07F 1/02; G07F 7/00
[52] U.S. Cl. .................. 194/204; 194/346; 194/351
[58] Field of Search .................. 194/203, 206, 194/207, 210, 346, 351, 204, 202

[56] References Cited

U.S. PATENT DOCUMENTS

| | | | |
|---|---|---|---|
| 1,741,978 | 12/1929 | Courtney | 194/346 X |
| 1,752,750 | 4/1930 | Mills | 194/346 X |
| 3,850,299 | 11/1974 | Kreitzer . | |
| 4,037,703 | 7/1977 | Michaud et al. | 194/203 |
| 4,348,656 | 9/1982 | Gorgone et al. | 209/534 X |
| 4,893,706 | 1/1990 | Ibarrola | 194/346 |
| 5,040,658 | 8/1991 | Levasseur | 194/346 |

FOREIGN PATENT DOCUMENTS

| | | |
|---|---|---|
| 7909576 | 12/1980 | France . |
| 2323839 | 11/1974 | Germany . |
| WOA-81/01211 | 4/1981 | WIPO . |

*Primary Examiner*—F. J. Bartuska
*Attorney, Agent, or Firm*—Fish & Richardson P.C.

[57] ABSTRACT

A banknote selector comprises an aperture obstructed by a balance rotary shutter, the angular position of which is insensitive to the vibrations of the selector.

23 Claims, 9 Drawing Sheets

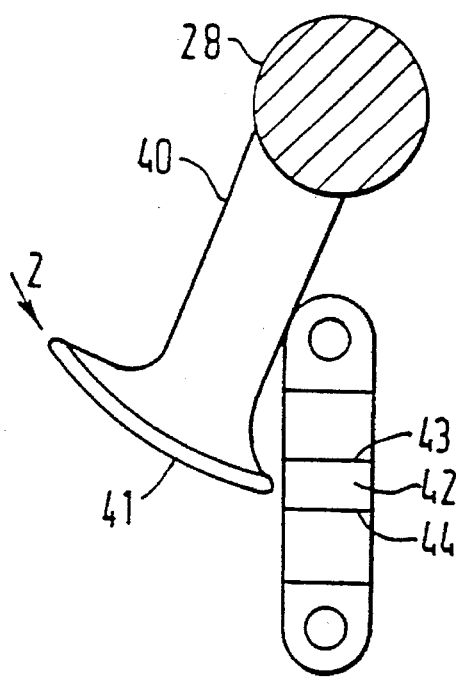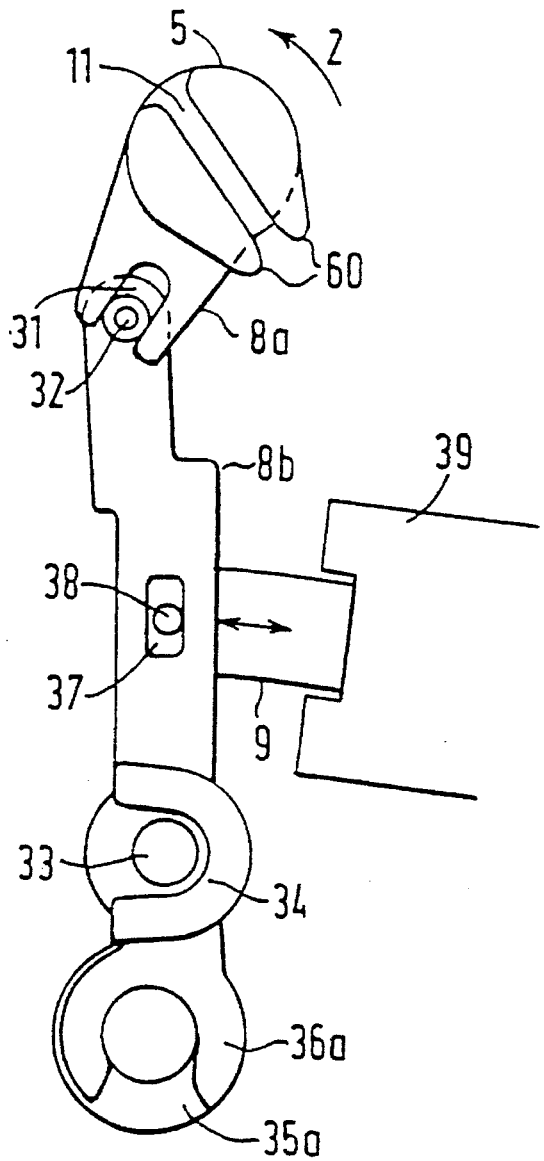

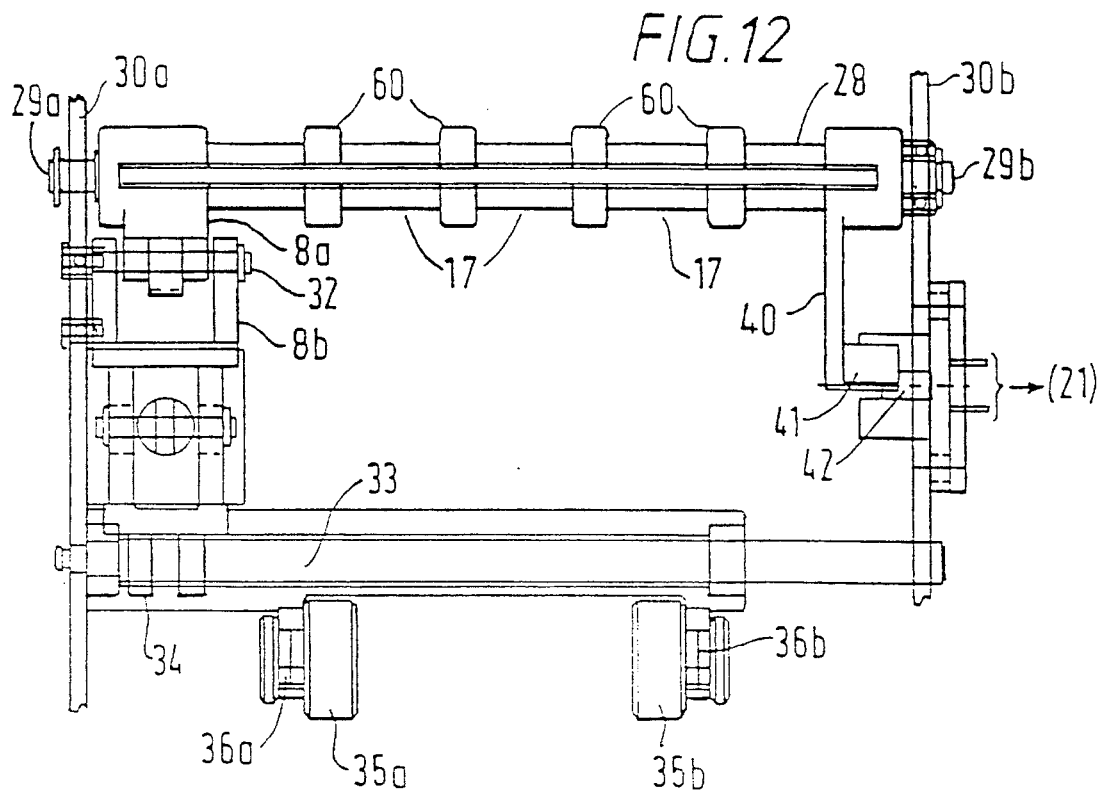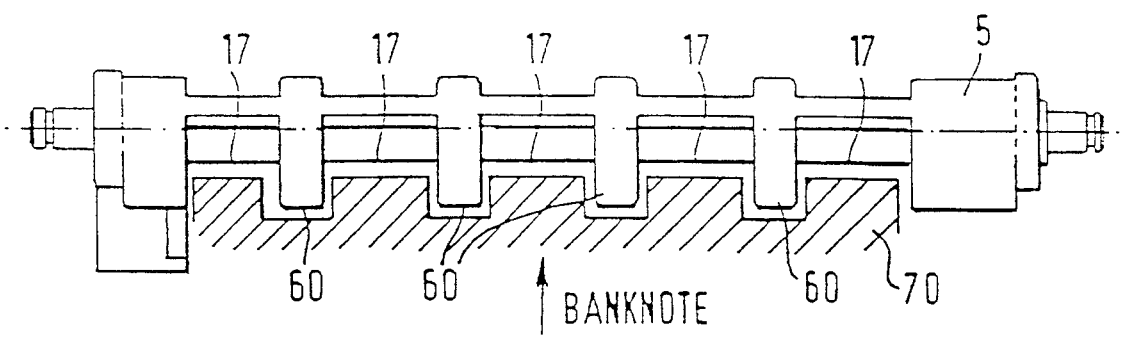

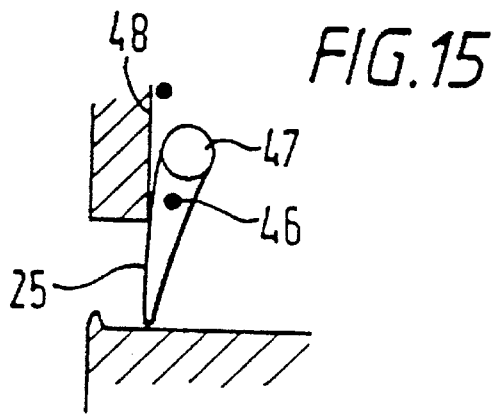
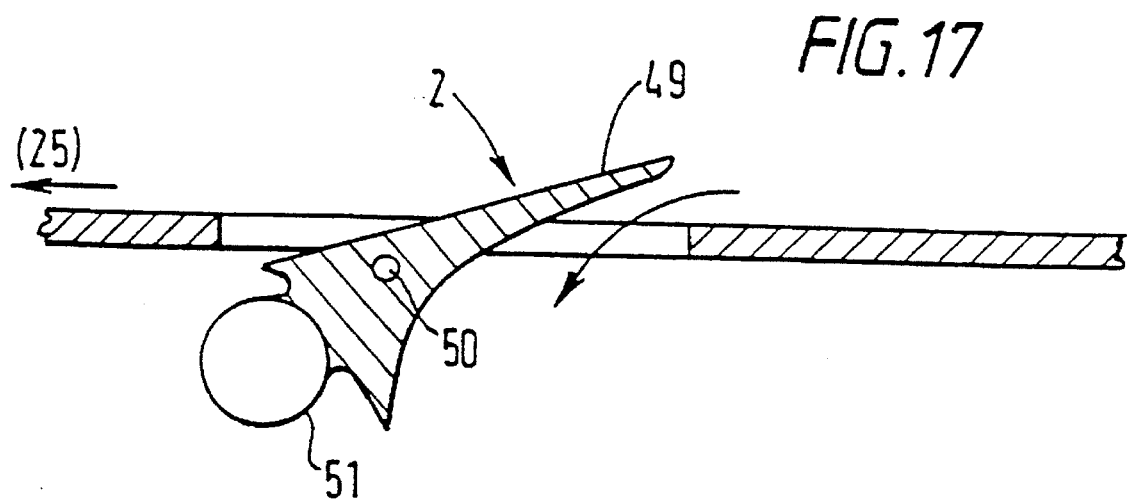

DOCUMENT HANDLER

FIELD OF THE INVENTION

The present invention concerns the field of document handling apparatus, more particularly for banknotes.

Apparatuses of this type, for example banknote validators, also referred to as selectors throughout the following, are integrated into automatic machines selling goods or a service to users. They are generally applied at the moment to suitable processing of banknotes and also of other documents of value such as certain standard types of checks. Throughout the following, the term document will designate a rectangular sheet of paper or other material of suitable dimensions, introduced by the user into the selector, this sheet being recognized as a genuine note or not after authentication tests.

DESCRIPTION OF THE BACKGROUND ART

Known selectors may comprise an inlet aperture, widened out to a greater or lesser degree and protected from the weather to a greater or lesser degree, ending in a passage having a width greater than the width of the document and bounded by an upper face and a lower face. These two faces open into an inlet channel where the document is grasped by a transport means for the document, commonly termed a transport system, and consisting generally of a system of belts or rollers, cylinders, motor and pulleys. The setting in operation of the motor of this system is controlled by a control circuit or "processor", which acquires the necessary data in particular through a system for detecting the document in the aperture; this system comprises for example sensors which detect the presence of paper. The tests for authentication of the document themselves may take place in a second part of the selector, situated after the inlet channel. If the document is not recognized as a genuine note, it is directed towards a rejection outlet, which may be different from the inlet aperture or otherwise, in order to return it to the user, who is assumed to have acted in good faith.

If at the end of these tests the document is recognized as genuine, it is switched towards a box, intermediate or final, depending on the model of automatic machine. In the model with a final box, any note recognized as genuine releases a transaction. In models with an intermediate box ("escrow"), the note is first stored in this intermediate box and its face value is credited. The transaction is released when the selling price is reached. If the user so wishes, he can cancel the request and his documents which have already been introduced are returned to him through the intermediate box. Such a device is described for example in FR-7909576.

It is known to obstruct the passage physically by means of a shutter, situated between the aperture and the inlet channel. The obstruction of the inlet channel is intended to prevent any premature introduction of a further document into the aperture. The routines of acquisition and processing of the signals for detection of a document presented by the user lead to the setting in operation of the transport motor, then to the process of recognition of the document (check or banknote, currency of the note, face value) and to its authentication. These routines take what seems a long time to the user. If the latter then attempts to introduce a second document into the aperture and the inlet channel and the latter is not obstructed, the sensors for detecting the presence of paper then send signals to the processor which disturb the normal functioning of the processor.

FR-7909576 describes a shutter consisting of a smooth plate actuated by an electromagnet which opens it when a presence sensor detects the presentation of a document in the aperture. DE-2323839 describes on the one hand a shutter in the form of a rod sliding in a casing, the rod partially obstructing the passage of the document, and on the other hand a shutter having a width greater than that of the passage of the document, completely obstructing its passage.

In WO 81/01211 (and equivalent publications EP 0028089 and US 4348656), specifically in FIG. 9 thereof, there is disclosed a banknote validator in which an inlet shutter comprises a cylinder carrying a slot therethrough to allow passage of a note in one orientation of the cylinder. However, here is no disclosure of the arrangement by which the shutter is rotated, or of the susceptibility of the shutter to vibration. Separately, in the embodiment of FIG. 11a thereof, an arrangement showing a plurality of fixed teeth is described.

The shutters of the known selectors have the drawback of being sensitive to vibration. If the automatic machine is fixed but subjected to tremors or vibrations, for example on an underground train platform on arrival of a train, or mounted on board a vehicle such as for example a train, these vibrations may open the shutter prematurely and thus permit the introduction of a second document. The second document may then interfere with the processing of the first document and lead to the rejection of genuine notes.

Linear mechanical vibrations fore and aft, up and down or from side to side of the apparatus can thus be converted by the pivotal motion of the inlet shutter (and, for that matter, other shutters or diverters in the apparatus) into substantial pivotal oscillations, depending on the resonances of the shutter.

SUMMARY OF THE INVENTION

The present invention solves this problem by providing that the mass of the assembly comprising the shutter and its actuating components (and other components which can move with the shutter) is distributed such that there is no turning movement or couple about the axis around which the shutter pivots. In one embodiment, this is achieved by providing that the center of mass of the shutter and other components associated therewith lies on the axis about which it pivots. In another embodiment, other components which move with the shutter are pivoted about a further axis, and the mass of the system is so distributed that there is no couple about either axis.

The invention is employed particularly where the shutter, together with its associated actuating components, does not consist of a single rotationally symmetrical component of homogeneous mass mounted concentrically; for example, where it consists of a rotationally symmetrical shutter with an associated actuating arm extending away from the axis thereof, or where (as is the case, for example, in note diverter plates or outlet shutters) the shutter itself is not rotationally symmetrical. In a simple embodiment, the shutter may comprise an outlet shutter consisting of a plate-like flap pivoting around an axis, with a counterweight positioned on the other side of the axis thereto.

In another aspect, the present invention provides a pivotable shutter which is rotationally symmetrical about a pivoting axis, which carries projecting and/or recessed portions to engage with corresponding recessed and/or projecting portions in the surround to the shutter, to prevent a document from passing between the surround and the shutter. This advantageously prevents jams in the region of the shutter, and attempts to defraud the apparatus.

In a particular form of embodiment of the invention, means are provided to modify the angular position of the shutter in response to the action of one or more systems for detecting the presence of paper. These detection systems are for example photodiodes, arranged upstream of the shutter in the aperture and/or downstream of the shutter, and connected to the processor, which generates a command to open the shutter when a document is presented in the aperture, and then close the shutter when the signal sequence indicates that the document has passed the shutter.

In a particular form of embodiment of the invention, a shutter is approximately in the shape of a cylinder of revolution about a pivot axis and having a length greater than the width of the inlet aperture. A slot is provided in this cylinder to allow the document to pass through.

In relation to a device only partially obstructing the passage of the document, an advantage of the cylindrical shape is complete closure o the aperture. Some persons attempting fraud try to disturb the mechanism of the selector by introducing thin strips of paper into the aperture. With this cylindrical shape, the passage is completely closed and these attempts are unsuccessful.

In a particular form of this embodiment of the invention, the intersection between the surface of the cylinder and the two faces of the slot is rounded so as not to damage a document which might for example have been introduced immediately after a first document, before the order to close the shutter had been given by the processor.

A drawback of shutters offering a smooth surface to the leading edge of the document introduced into the aperture is that the document may stray into the space comprised between the shutter and its casing or its seating. In order to remedy this drawback, in another aspect of the invention, the intersection between the surface of the cylinder and the plane of movement of the document is non-recilinear, consisting for example of a broken line. The same form of line is adopted for the two faces of the aperture and of the inlet channel, this line being able for example to be in the shape of grooves provided in the surface of the cylinder and in which there circulate teeth provided at the end of the two faces of the aperture and of the inlet channel. These teeth prevent the document from straying between the shutter and its surround.

When the shutter is brought into the "open" position by the detection of a document in the aperture, a detector for detecting the presence of paper, situated downstream of the shutter, is first of all typically occluded by the leading edge of the document which is passing through the slot of the shutter, then de-occluded by the trailing edge of the document, once the shutter is passed. The processor then causes a rotational movement of the device through an angle sufficient to ensure closure by the shutter.

In a particular form of embodiment of the invention, the drive means of the shutter consists of an electromagnet (e.g. a solenoid), the rest position of which corresponds to the closed position, and the actuated position no a maximum opening position of the shutter. In this form, which has the advantage of simplicity and moderate cost, the pivoting angle permitted for the shunner may be not in excess of 30° to 45°. It is possible in this form no reduce the total dimensions of the selector by judicious placing of the electromagnet.

The drive means in this, or another, embodiment may comprise a linear actuator (e.g. solenoid core) acting on a lever portion extending from the shutter axis.

In one arrangement of this particular form of embodiment of the invention, in is possible to prevent vibrations, generally random in direction, from disturbing the proper functioning of the drive means, by providing on the one hand a mechanical means for the return of the shutter to its closed position, this means bearing on a fixed stop, and on the other hand unilateral driving of an arm, rigidly connected to the shutter, by the plunger of the electromagnet, In this way, if the plunger is affected by the vibrations, it does not take with it the arm rigidly connected to the shutter when the latter is at rest. When the electromagnet is actuated, the vibrations of the plunger may temporarily disturb the introduction of the document into the slot of the shutter. This is less troublesome, and can be corrected by providing the slot with the asymmetric shape of a venturi. In this way, the slot has a supplementary function of guiding the leading edge of the document which persists even in the case of vibration in the open position.

Embodiments of the invention may make it possible to nullify attempts at "string" fraud. In this type of fraud, the person attempting fraud attaches to a document threads, strings, tapes or other means of acting on the position of the document from the outside, when the transport system alone is supposed to transport the document. In certain cases, the person attempting fraud attaches together two documents, only one of which, for example, is a genuine note. When the automatic machine comprises a rejection outlet different from the aperture, he may thus hope that the false document, once it has been refused, will bring the genuine document along behind it.

In a form of embodiment of the invention where the shutter turns through an angle of less than 180°, and where the slot is always presented in the same direction to the aperture, there can be incorporated in the slot a device detecting the presence of "strings" attached to the document. This device, particularly suitable for the detection of wide or relatively rigid "strings", may for example consist of a secondary shutter obstructing the slot in the closed position where the direction of the slot is close to the vertical. This secondary shutter can come automatically into position simply by gravity and, by nipping the strings, exerts a braking action on the document at the moment when the transport system grasps and conveys the document.

In a particular form of embodiment of the invention, the slot of the shutter is symmetrical in relation to the axis of the cylinder, and the position of the shutter does not depend on any stop or any passive return means. In this case, rotations of the shutter through any angle whatever, but still equal to an odd number of times 90°, mean that the shutter passes alternately from the open position, in which the slot is parallel to the direction in which the document is introduced, to the closed position, in which the slot is perpendicular to that direction.

In a particular form of embodiment of the invention, provision is made for rotation to take place normally always in the same direction.

In another form of embodiment of the invention, the direction of rotation can be controlled by the processor, which is moreover capable of checking precisely the position of the shutter. This checking may be effected by means of a position detector on the one hand, consisting for example of an encoder disc rigidly connected to the shutter and coupled to a plurality of assemblies of fixed optical emitters and receivers, and on the other hand by a precise control of the motor driving the shutter, which may for example be a stepping motor or a motor with reduction gear.

In this form of embodiment of the invention, the processor can be programmed so than in causes the shutter to rotate by a determinate multiple of 90°, the value of which multiple takes into account whether the slot is or is not symmetrical in relation to the axis of the cylinder. The encoder disc may for example comprise a defined number of slots on its periphery, the distance between these slots and the axis of rotation common to the disc and to the shutter being selected so that the beams of the optical emitter and receiver assemblies are occluded or de-occluded in succession, according to a sequence recognizable by the processor.

It can be imagined that if the processor is programmed so that it causes the shutter to turn through a certain multiple of 90°, for example during the course of a checking routine after the passage of a document into the slot, any strings will be trapped between the shutter and its seating.

In a particular form of embodiment of the invention, in order to prevent the user from inserting a new document into the slot during such a routine where the shutter passes several times through an open position, it is possible to provide two successive shutters, the first, for example of a conventional type, obstructing the passage and the second, of a rotary type, serving to detect any strings.

In an aspect of the invention, means are provided in addition to permit the processor to detect quickly, before total paralysis of the selector or overheating of the drive means Of the shutter, if the document is slowed down or stopped by strings which are nipped between the shutter and its seating. For this purpose, a mechanical return means, such as for example a spring, may be provided between the shutter and its drive means, coupled to a contact which closes in the case of tension of this spring. The signal sent to the processor by the closure of this contact leads to the conclusion that there is an attempt at fraud and to a decision to return the document even before having started the authentication tests. Another possible means of detecting an incorrect velocity of the document is the instantaneous calculation of its velocity by means of the information provided by the systems for detecting the presence of paper, for example CCD diodes, and its comparison with the nominal value corresponding to the speed of the motor driving the belts. This aspect can be used independently of the features of the main claim.

In a particular form of this aspect of the invention, control by means of a bistable electromagnet eliminates the risk of heating up.

It may be advantageous, in the case where the maintenance personnel is not alerted after the automatic machine has been put out of service, to thwart the attempts at fraud enough to discourage the person attempting fraud, without however putting the apparatus out of service. For this purpose, in a particular form of embodiment of the invention, provision is made, when the processor has detected an attempt at fraud, for the person attempting fraud to be deceived by simulating a breakdown caused by this attempt at fraud, this simulation of a breakdown taking place only during a limited time lag, but sufficient for the person attempting fraud to be discouraged. In this aspect of the invention, the processor, during the whole of the time lag, causes the shutter to turn in the opposite direction to normal, until the shutter is brought into the initial position which it occupied at the moment of introduction of the document having generated the fraud signal. This maneuver, or other programmable disengagement routines, eliminates the traps in which the strings are jammed. Once the causes of the braking of the document have been eliminated, the document is then directed towards an auxiliary box, different from the intermediate or final box, wherein doubtful notes are stored for subsequent manual sorting. In such a case, the operating time of the motor of the transport system can be extended to finish freeing the passage, even when the strings are very long. Even if in such a case the person attempting fraud succeeds in withdrawing his document by means of the strings remaining accessible from the outside, the processor can keep in its memory the data of the incident, in order to make it possible to recognise more fully and analyze the types of fraud. This aspect of the invention is useful independently of other features of the invention.

The above routine can be improved by increasing the time lag if several attempts at fraud are detected following one after the other. In this way, it is possible gradually to discourage even persons attempting fraud who after a first attempt, made, for example, at a time of day when the automatic machine is little used, would then be diverted towards other automatic machines of the same station.

In a particular form of embodiment of the invention, the user is asked to wait before introducing the following document by an optical signal such as for example a red indicator light and a green indicator light, the red indicator light going on when the processor orders the closure of the shutter and the green indicator light going on once the selector is available for handling a new note.

The invention may advantageously be used in a banknote validator as described in our earlier International Application PCT/CH93/00095, published as WO93/21609, which is incorporated herein in its entirety by reference.

Furthermore, the features of our earlier UK application GB9314404.6 are also useable with the present invention, and this application is likewise incorporated herein in its entirety by reference.

Other inventions with which the present invention are useable are as described in our co-pending United Kindom applications 9320190.3 and 9320167.1 filed on 30 Sep. 1993, which are likewise incorporated herein in their entirety by reference.

BRIEF DESCRIPTION OF THE DRAWINGS

Embodiments of the invention will now be described, by way of example only, with reference to the accompanying drawings in which:

FIG. 11 shows a side view of a third embodiment of the invention;

FIG. 12 shows a corresponding front view;

FIG. 13 shows a sectional side view corresponding to that of FIG. 11 and illustrating the far end of the same embodiment;

FIG. 14 is a plan view illustrating the engagement of the shutter of the same embodiment with its surround;

FIG. 15 shows a sectional side view of an outlet shutter according to a fourth embodiment of the invention;

FIG. 17 is a detail of FIG. 16 and shows the diverter according to the fifth embodiment of the invention in greater detail.

First Embodiment

FIGS. 1 to 7 show the functioning of a cylindrical shutter 5 according to a first form of embodiment.

Figure 1:
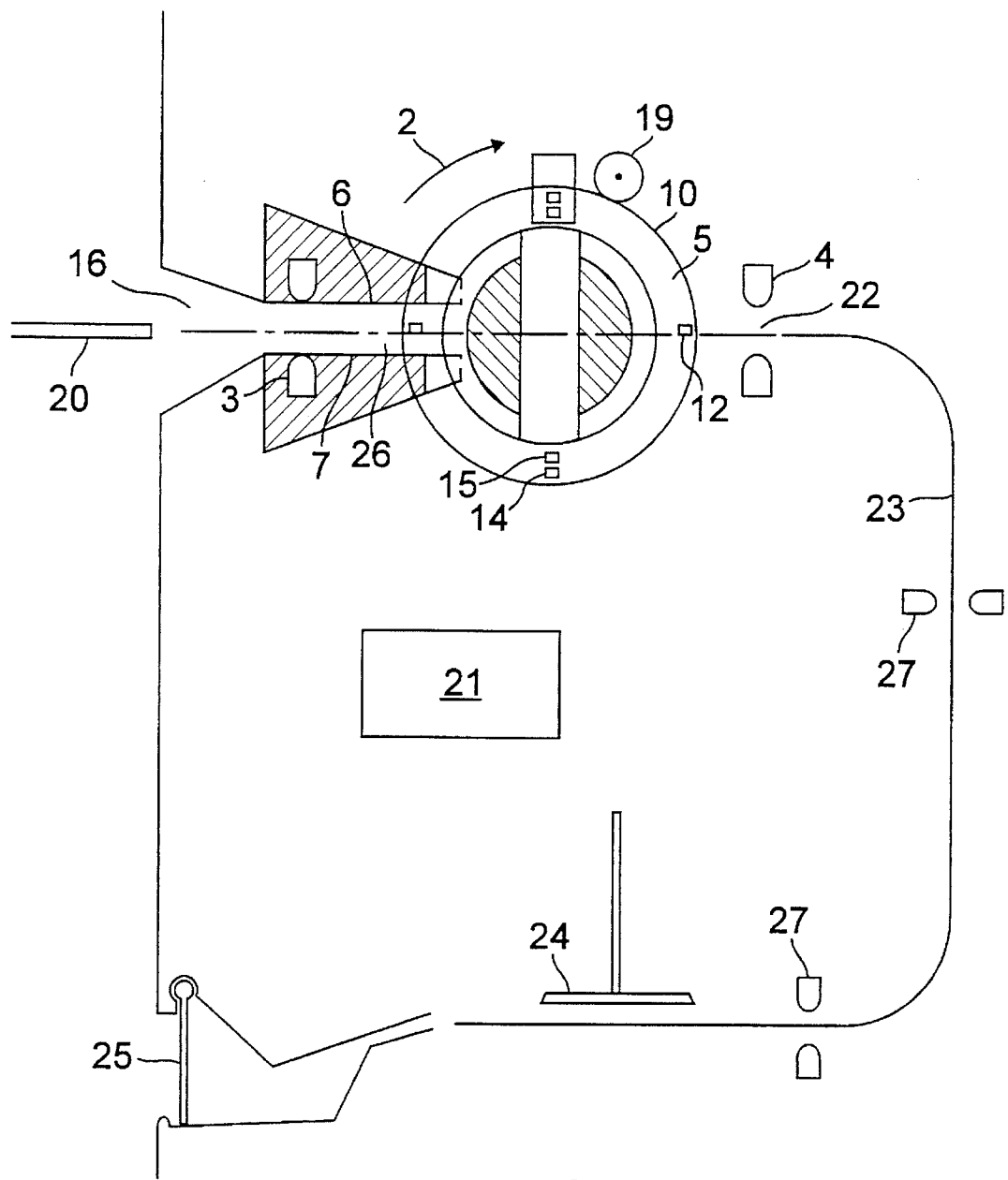
FIG. 1 shows a sectional side view of the selector and of the shutter according to a first form of embodiment.

FIG. 1 shows a side view of a vertical section through the aperture 16 of the selector, the inlet channel 26, the shutter 5, the motor 19, the inner part 22 of the selector located downstream of the shutter, and also diagrammatic representations of the processor 21, the transport path 23 including occupation detectors 27, a stacking piston 24, and also an outlet shutter 25.

Figure 7:
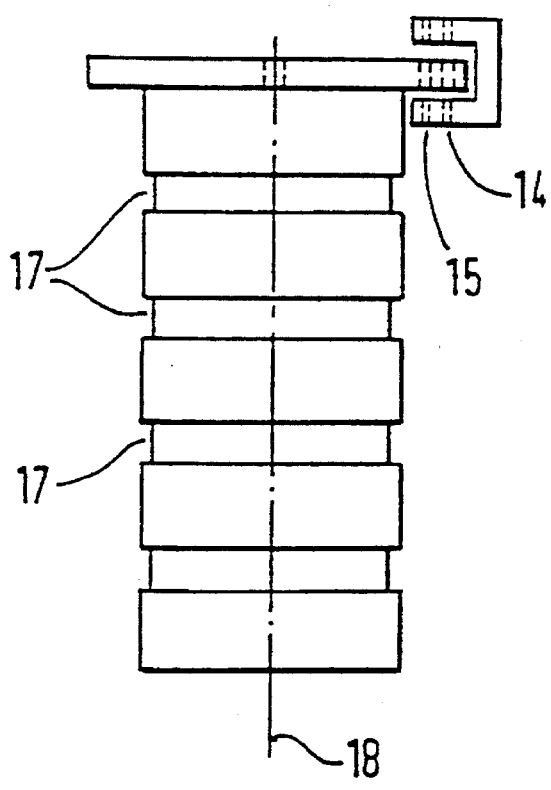
FIG. 7 shows a top view of the shutter in the position in FIG. 2 with a first form of embodiment of the grooves.

The cylindrical shutter 5 is equipped with a slot 11 placed longitudinally, permitting the passage of documents. It is movable in rotation about an axis 18 (FIG. 7).

The arrow 1 designates the direction in which the documents 20 are introduced, and the arrow 2 indicates the normal direction of rotation of the cylindrical shutter 5 about the axis 18.

The drive unit 19 is in this case a stepping motor or a motor with reduction gear. An encoder disc 10 with several windows 12 is rigidly connected to the cylindrical shutter 5, the center of gravity of the assembly being located on the axis 18, which makes the angular position of the cylindrical shutter 5 insensitive to vibration. The encoder disc 10 functions with two assemblies emitting and receiving optical beams 14, 15, located opposite the windows 12 for checking the position of the cylindrical shutter 5, the whole being associated with detectors 3, 4 located in the input channel 26 and on the inside 22 of the apparatus to detect whether the documents 20 have passed the slot 11 and are completely in the inner part 22 of the selector, downstream of the shutter 5.

The input channel 26 comprises two faces 6, 7 provided in the manner of a comb, the teeth of which enter grooves 17 of the cylindrical shutter 5, preventing the document 20 from passing round the cylindrical shutter 5 on introduction into the slot 1 or on leaving the slot 11 towards the inner part 22 of the selector located downstream of the shutter.

The processor 21 orders the rotation of the shutter 5 by way of the motor 19 if neither of the two detectors 3 and 4 detects the presence of a document. If the detector 3 detects the presence of a document, the motor 19 rotates the shutter 5 into the position shown in FIG. 2 or 4. If the detector 4 detects the presence of a document, the shutter is maintained in the position in FIGS. 2 and 4.

The transport path 23 conveys the document 20 through an authentication sub-assembly of the selector, for example such as described in U.S. Pat. No. 3,277,256, then stores it in a position where it can be enclosed in an intermediate or a final box, according to a device as described for example in Patent Application FR-2 453 811, by means of a stacking piston 24. If the document 20 is not recognized as genuine following the authentication tests, the processor 21 orders the opening of the outlet shutter 25 and the transport system conveys the document 20 as far as the outlet shutter 25, where it is recovered by the user.

The occupation detectors 27 of the transport path 23 serve to detect the presence of a document 20 in the inner part 22 of the selector located downstream of the shutter 5. They may consist for example of CCD diodes, and supply the processor with information concerning the state of occupation of the transport path 23. This path only becomes free when a document 20, once the detector 4 is de-occluded, has either passed the outlet shutter 25 or been boxed by the stacking piston 24, as described hereinafter.

Figure 2:
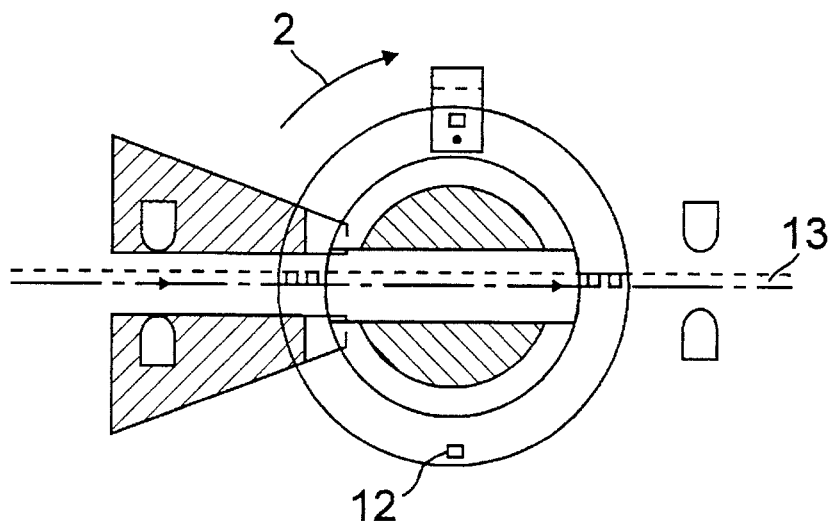
FIGS. 2 to 4 show a side view of a vertical section through the aperture of the selector and the shutter according to the same form of embodiment.
Figure 3:
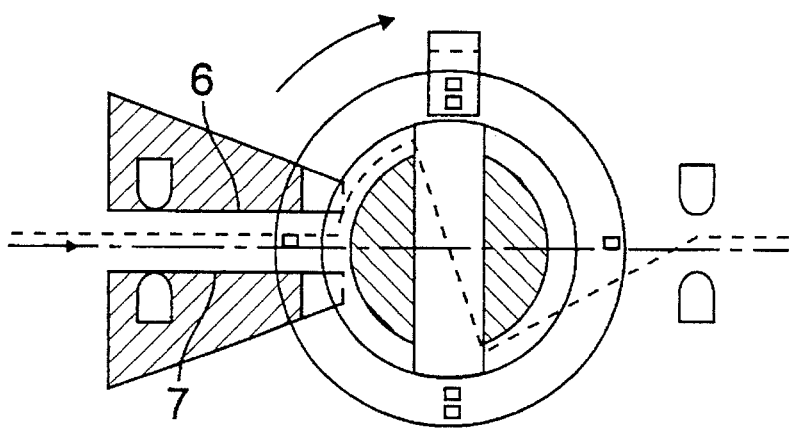
Figure 4:
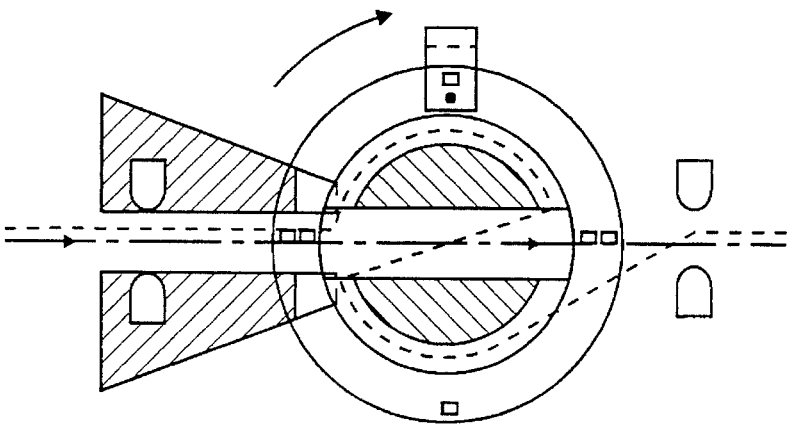

FIGS. 2 to 4 show the functioning of the shutter in a particular example where the cylindrical shutter 5 rotates from the position shown in FIG. 1 always in the same direction of rotation 2, with four defined stop positions at 90°, 180° and 270° with respect to the plane of introduction of the documents 20 into the aperture 16. The position at 360° corresponds to a return to the position in FIG. 1. These positions are detected for example by two optical beams 14, 15 in the following manner:

when only the outer beam 14 is de-occluded by a single window 12, the shutter 5 is in the open position, as indicated in FIGS. 2 and 4;

when the two beams 14 and 15 are de-occluded by the windows 12, the shutter 5 is in the closed position described with reference to FIGS. 1 and 3;

when neither of the two beams 14 and 15 is de-occluded by any window 12, the shutter 5 is in an intermediate position between the open position and the closed position.

The cylindrical shutter 5 in FIG. 1 prevents access to a document 20 at the inner part 22 of the selector.

Processor 21

The processor 21 receives information both from the detectors 3 and 4 and from the optical beams 14 and 15 and the occupation detectors 27. It utilises all the information simultaneously according to a scheme described hereinafter to act on the control of the stepping motor 19 in such a way that the information received from the optical beams 14 and 15 corresponds to the nominal value as determined in a certain number of different states of the selector:

a state 100 corresponds to a de-occluded diode 3, a de-occluded diode 4, the transport path 23 free. In this state 100, the shutter 5 should be closed and the instruction is that the two optical beams 14 and 15 should be de-occluded.

a state 10A corresponds to a de-occluded diode 3, a de-occluded diode 4, at least one of the occupation detectors 27 occluded, which means that the transport path 23 is occupied. In this state 10A, the shutter 5 should be closed and the instruction is that the two optical beams 14 and 15 should be de-occluded.

a state 200 corresponds to an occluded diode 3, a de-occluded diode 4, the transport path 23 free. In this state 200, the shutter 5 should be open, and the instruction is that only the optical beam 14 should be de-occluded.

a sane 300 corresponds to an occluded diode 3, an occluded diode 4, the transport path 23 free. In this state 300, the shutter 5 should be open, and the instruction is that only the optical beam 14 should be de-occluded.

a state 400 corresponds to a de-occluded diode 3, an occluded diode 4, the transport path 23 free in this state 400, the shutter 5 should be open, and the instruction is that only the optical beam 14 should be de-occluded.

a state 500 corresponds to a de-occluded diode 3, an occluded diode 4, the transport path 23 occupied. In this state 500, the document 20 is already engaged on the transport path but has not yet passed the detector 4. This state can detect an anomaly such as an attempt at "string" fraud. It may then be decided that the shutter 5 should for example be open, so as not to hinder the progress of the note, and the instruction is then that the two optical bundles 14 and 15 should be de-occluded. In such a case, the transport path can be actuated and the outlet Shutter 25 opened until the document 20 is discharged, after which the system is back in the state 100 and the shutter 5 is closed.

a state 600 corresponds to a de-occluded diode 3, a de-occluded diode 4, the transport path 23 occupied. In this state 600, the shutter 5 should be closed and the instruction is that the two optical beams 14 and 15 should be de-occluded.

As will be seen, other information reaching the processor 21 can lead to the same routines of discharge of the document 20 as those corresponding to the state 500.

As soon as the document 20 is completely in the inner part 22 of the selector downstream of the shutter 5, two cases are possible: the first in which there is a document 20 only, and the second case in which the document 20 has been introduced by a person attempting fraud who has placed strings 13 (indicated by dotted lines in FIGS. 2 to 4) at the rear of the document 20.

In both cases, when the detectors 3 and 4 are de-occluded after the passage of the first document 20, the motor 19 again causes the shutter 5 to rotate through 90° (FIG. 3) into a stop position of 180°, which makes it possible to prevent the introduction of a second document 20 while the first is being processed. Once the processing of the first document 20 is terminated and the apparatus detects the presence of a second document 20 at the aperture 16, the cylinder rotates again through 90° (FIG. 4), thus permitting the entry of the second document 20; as soon as the latter is completely inside the apparatus, the cylinder rotates through 90° to be once more in the position described with reference to FIG. 1 and to recommence the sequence.

In the case where the shutter 5 can rotate in both directions, the position checking system with the encoder disc 10 makes it possible to detect forward or reverse movement starting from the closed position of the shutter 5, brought about by strings or any kind of instrument, and at the same time to check whether it has not been blocked, forced or turned to perpetrate a fraud or to damage it.

Position Identification

Figure 5:
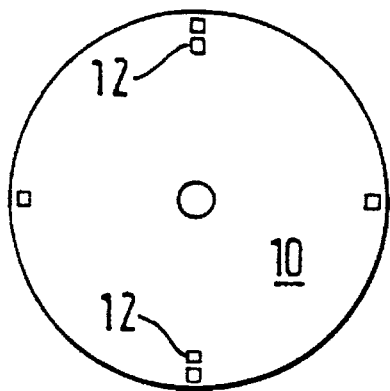
FIG. 5 shows, on the same scale, a side view of an encoder disc rigidly connected to the shutter, the latter being in the closed position.

FIG. 5 shows a first example of a device making it possible to identify the open or closed position of the cylindrical shutter 5, and to send a corresponding signal to the processor 21. In this device, the slot 11 is symmetrical, which means that rotation of the cylindrical shutter 5 through 180° brings it into the position for receiving a new document 20. This device comprises an encoder disc 10 rigidly connected to the shutter 5, itself comprising four points of reference consisting, according to the case, of one or two windows 12 of small dimensions.

It furthermore comprises, as will be seen in FIG. 7, two assemblies 14, 15, each consisting of an optical emitter and receiver, known per se, inserted into the seating of the cylindrical shutter 5 in such a way that the encoder disc 10 masks or allows through a beam of light passing from the emitter to the receiver of each of the two assemblies 14, 15. In the example shown in FIGS. 1 to 5, the position of the encoder disc 10 corresponding to the closed position of the cylindrical shutter 5 is that in which two windows 12 allow the two beams to pass. The position of the encoder disc 10 corresponding to he open position of the shutter, as can also be seen in FIGS. 2 and 4, is that in which only the window furthest from the axis of rotation allows the beam 14 to pass.

This device allows the processor 21 to be certain of the position of the cylindrical shutter 5 and, by counting the pulses received in sequence by each receiver, of the total angle of rotation of the cylindrical shutter 5. If the slot of the latter is not symmetrical but is arranged to admit the documents in only one direction, it is sufficient to omit the corresponding window in the encoder disc 10. This device also allows the processor 21, by comparison of the information thus received with that coming from the drive means 19 of the cylindrical shutter 5, for example a stepping motor or a motor with reduction gear, to detect abnormal braking of the rotation of the cylindrical shutter 5 by slipping of a clutch, or by tensioning of a spring or other deformable mechanical device serving as a means of transmission between the stepping motor 19 and the cylindrical shutter 5.

Likewise, when the document 20 is driven by the transport system and for example one of the strings 13 is nipped in a groove 17 of the cylindrical shutter 5, it drives the latter in rotation, thus modifying the positioning signal sent by the receivers of the beams 14, 15. There also the processor 21 can immediately conclude that a fraud is being perpetrated and can treat the document 20 accordingly, that is to say, by discharging it through the transport path 23 as far as the previously opened outlet shutter 25. This treatment may for example utilise the same routine as for example that initiated by the state 500 described previously.

Figure 6:
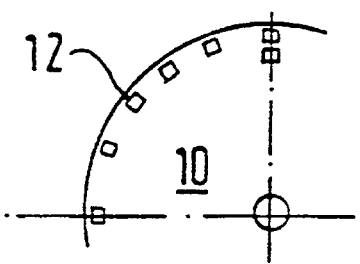
FIG. 6 shows a partial view of a particular form of embodiment of the encoder disc in FIG. 5.

FIG. 6 shows another example of the device for identifying the position of the shutter. In this form of embodiment, the encoder disc 10 comprises several windows 12 distributed over its periphery. The angular position of the shutter can be identified for example by providing each window 12 with optical properties recognizable by the receivers of the beams 14 and 15, for example a shape or dimensions particular to each window, or by installing in each window an element which is translucent but of a specific color. The color recognition device can then advantageously utilize elements used within the framework of the authentication process for the notes.

Second Embodiment

Figure 8:
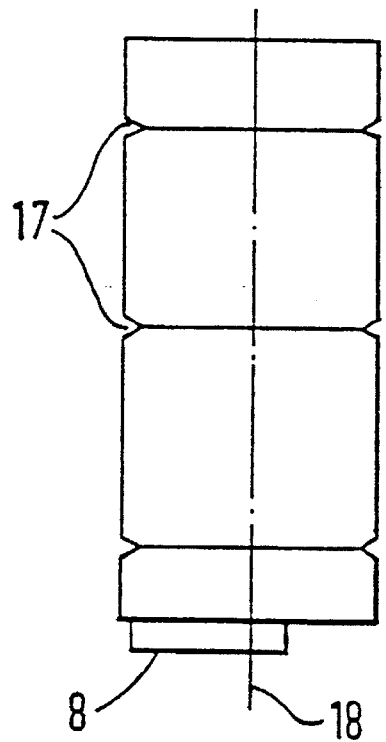
FIG. 8 shows a partial top view of a second form of embodiment of the invention, corresponding to the position in FIG. 10, and wherein the shutter has a second form of embodiment of the grooves.
Figure 9:
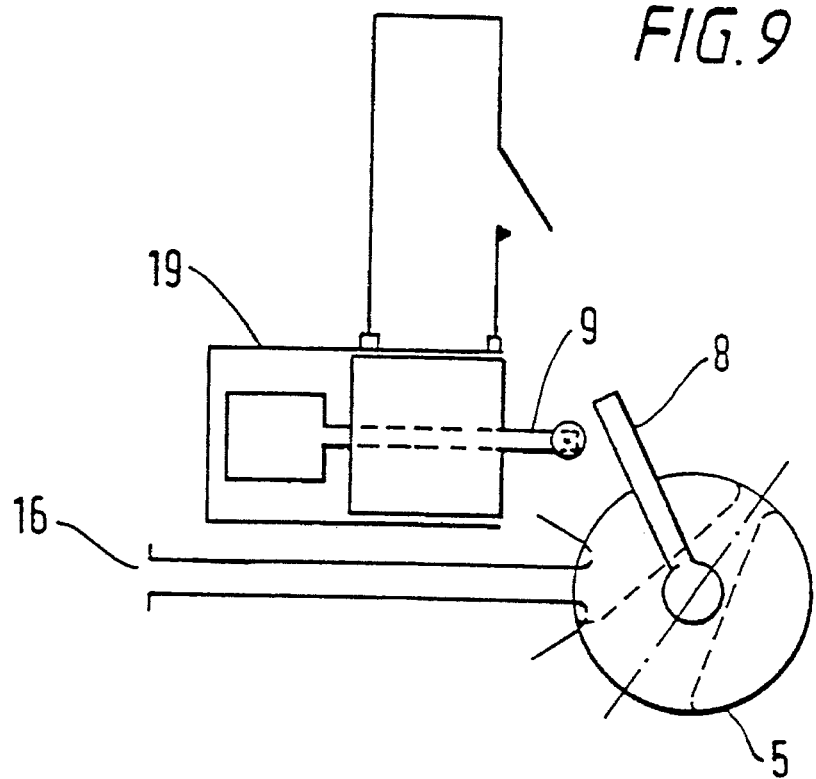
FIG. 9 shows a profile view of the second embodiment of the invention, the relay being at rest.
Figure 10:
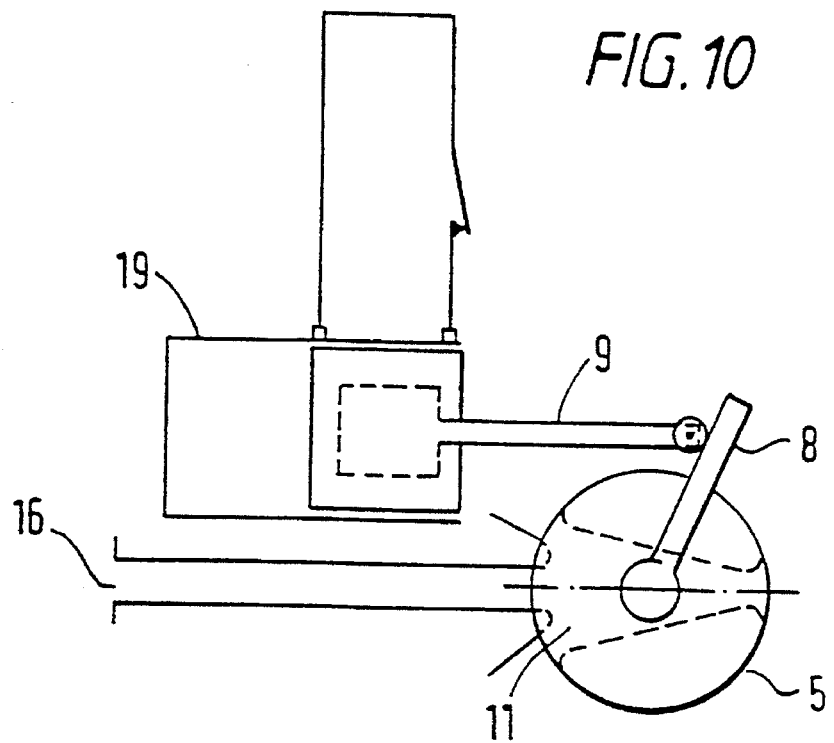
FIG. 10 shows the same profile view of the second embodiment of the invention, the relay being under tension.

FIGS. 8 to 10 show a second, simpler form of embodiment of the invention, wherein the grooves 17 have a notched shape, and correspond to teeth (not shown in FIGS. 8 to 10) of corresponding shape at the end of the faces 6, 7 of the aperture and of the corresponding faces of the inlet channel 26.

An arm 8 rigidly connected to the shutter controls its rotation between two angular positions shown in FIGS. 9 and 10. The arm 8 is driven by the plunger 9, terminated by a small roller, of an electromagnet 19.

In FIG. 9, the control circuit of the electromagnet 19 is open. No part of this electromagnet 19 is in contact with the arm 8 or with the cylindrical shutter 5, which is maintained in the closed position in FIG. 9 by a return spring, not shown, bearing on a stop linked to the frame and bringing the arm 8 back in the opposite direction to the direction of rotation 2 in FIG. 1. As the center of gravity of the assembly 5, 8 is located on the axis 18 in FIG. 8, the slot 11 is not sensitive to vibrations capable of affecting the frame in this position.

In FIG. 10, the control circuit of the electromagnet 19 is closed. The plunger 9 pushes back the arm 8, bringing the cylindrical shutter 5 into the open position. The slot 11 is widened out into a flared portion ("venturi") so that any vibrations affecting the plunger 9 do not compromise the stability of the open position in FIG. 10.

Instead of an electromagnet, an electric motor can be provided as drive means for the shutter 5 in FIGS. 9 and 10.

Third Embodiment

Referring to FIGS. 11–14, a further embodiment of the invention will now be illustrated.

Referring to FIG. 11, in this embodiment, the inlet channel 26 may be as disclosed in the earlier embodiments. The shutter 5 comprises a slot 11 defined between upper and lower portions of a cylinder 28.

Referring to FIG. 12, the cylinder 28 is mounted on stub axles 29a, 29b each in a rotary bearing (e.g. a ball race) in a respective sidewall 30a, 30b of a banknote validator. An arm 8a projects outwardly and downwardly from the cylinder 28 and is mounted fixedly thereto, so that swinging the arm 8a causes the cylinder 28 no rotate about the axis running through the axles 29a, 29b. The outermost portion of the arm 8a carries a fork 31, which receives a pin 32 carried upon the upper end of a lever arm 8b. The lever arm 8b pivots about a lower axle 33, which is likewise carried between the two sides 30a, 30b of the validator. The lever arm 8b is conveniently attached to the axle 33 by an expandable arcuate clip 34 of a plastics material. On the other side of the axle 33, the lever arm 8b extends and carries a counterweight arrangement 35, conveniently comprising a pair of metal weights 35a, 35b retained in corresponding arcuate expandable clips 36a, 36b of a plastics material.

Located within the lever arm 8b is a slot 37 within which a pin 38 is trapped, the long walls of the slot 37 being generally inclined parallel with the axis of the lever arm 8b. The pin 38 is fixed to the actuator (i.e. the core) 9 of a solenoid 39, solid with the wall 30a of the validator.

Thus, actuating the solenoid 39 in this embodiment causes linear movement of the core 9, which is translated into a pivoting of the lever arm 8b around the axis of the axle 33 by the slot 37. This in turn causes rotation of the arm 8a by the action of the pin 32 on the slot 31 therein, and in turn rotates the cylinder 20a and slot 11 into or out of alignment with the entrance channel 26.

As the total actuating length of the solenoid plunger 9 is generally only of the order of 4–5 mm of travel, conventionally it has been hard to use a solenoid or similar linear actuator device to actuate a rotary shutter. In this embodiment, it is desired to rotate the shutter through 45° between the open and closed states, and this would conventionally be difficult to achieve.

However, in this embodiment, it will be seen that the length of the lever arm 8b provides some multiplication of the rotation applied by the solenoid plunger 9; as the pin 32 is located further away (in this embodiment, over twice as far) from the axle 33 than the slot 37, the length of the arc through which the pin 32 is rotated by motion of the plunger 9 is larger by a corresponding factor. On the other hand, the length of the arm 8a is very much shorter, and so the travel of the pin 32 is converted by the slot 31 into a very much larger angular rotation of the arm 8a. To a first approximation, the amount by which the arm 8a (and hence the slot 11) rotates is in the same ratio to the angle through which the lever arm 8b rotates as the ratio between the relative lengths of the arms 8a and 8b.

Thus, by utilizing a lever arrangement to multiply the rotation caused by an actuator (e.g. the solenoid 39), an actuator with a small total travel such as a solenoid can be employed to generate a large rotation of the shutter 5.

Referring to FIG. 13 and FIG. 12, the cylinder 28 also carries, at the opposite end thereof to the arm 8a, a downwardly projecting arm 40 carrying an arcuate interruption surface 41 in the form of a cylindrical arc concentric with the cylinder 28. The surface 41 is positioned so as to be swingable into a slot 42 defined by upper and lower surfaces 43, 44. In one of the surfaces is located a light source 45a (e.g. a LED) and in the other is located a light detector 45b (e.g. a photodiode). When, as shown in FIG. 13, the shutter mechanism is closed and the slot 11 is misaligned with the inlet channel 26, the interruption surface is not within the slot 42 and the light beam between the light source 45a and the detector 45b is uninterrupted. When the shutter mechanism is pivoted in the direction 2, on the other hand, the interruption surface 41 enters the slot 42 and interrupts the light path between the light source 45a and the light detector 45b, allowing motion of the shutter 5 between the open and closed position to be monitored by the control circuit 21 connected to the light detector 45b.

With the arrangement of FIGS. 11–13, the relatively long lever arm 8b would normally be highly susceptible to vibration, which would then be transmitted to the arm 8a to cause the shutter 5 to vibrate which is in itself undesirable. Furthermore, the arm 40 is also highly susceptible to vibration, both transmitted from the cylinder 28 due to vibration of the lever arm 8b and directly induced in the arm 40. Vibration in the arm 40 is undesirable because it can cause the interrupting surface 41 to oscillate, causing rapid alternations between the interrupted and uninterrupted state of the light beam and giving rise to confusion as to the position of the shutter 5, and possible malfunction of the control circuit 21 as a result.

Accordingly, in this embodiment, the function of the counterweight arrangement 35 is to provide a counterbalance for the lever arm 8b, on the other side of the axle 33. However, the weight of the arm 8a, the plunger 9, and the arm 40 (and any other components which are moveable with the lever arm 8b, and are not already effectively counterbalanced by virtue of the mounting around the axles 29a and 29b) can simultaneously be sabilised by the counterweight arrangement 35. Thus, the counterweights 35a, 35b are selected so as to counterbalance not only the lever arm 8b but also the lever arm 8a, the plunger 9 and the swinging arm 40 an interrupting surface 41. It will be evident therefore, that longitudinal movements of the validator apparatus (i.e. movements generally transverse to the line between the two axles 29a and 33) are not translated into arcuate oscillations of the shutter 5 because of the counterweight arrangement 35.

The weight and position of the counterweight arrangement 35 is found by finding the centers of gravity of the arm 8a, the arm 8b, the solenoid core 9, and the swinging arm 41; finding the center of gravity of these centers of gravity; and arranging the counterweight mechanism to occupy a corresponding position and having a corresponding mass on the opposite side of the axle 33.

With this arrangement, there is no net movement about either the axis 29 or the axis 33 for any part of the shutter and actuating assembly. Thus, when a linear force is applied to the either of the axles 29 or 33 by a mechanical vibration of the entire device, no couple is created and hence no torque exists to twist any part of the assembly around an axle; the tendency of the arms 8a, 8b, and 9 to move to and fro between the axles 29, 33 is opposed by the counterweight 35 and vice versa.

Thus, this arrangement achieves exactly the same effect as the arrangement of FIGS. 9 and 10, in which the center of gravity of the shutter 5 and arm 8 is positioned on the rotational axis of the shutter 5, so that there is no net couple about that axis.

It would, of course, be possible to provide additional or alternative counterweighting arrangements solid with the arm 8a but on the opposite side of the axles 29a, 29b, so as to position the center of gravity of some or all of the arrangement on the axle 29a, 29b, as in the above embodiments. However, the present embodiment achieves a relatively compact construction.

Referring to FIG. 14, as in the embodiments of FIGS. 7 and 8, the diverter is provided with a number of recesses 17 along its length, interrupted by teeth 60 comprising, in this embodiment, eccentric arcuate segments (although this is not essential). The interengagement of the recesses 17 and teeth 60 with corresponding castellations in the surround portion 70 between the mouthpiece 16 and the shutter 5 prevents banknotes from being slid around the shutter 5 rather than through the slot 11, and thus helps to prevent jams or fraud.

Fourth Embodiment

In this embodiment, the outlet shutter 25 is also counterweighted to prevent vibration. In this case, the arrangement is less complex; as shown schematically in FIG. 15, the outlet flap 25 pivots on an axle 46, on the opposite side of which is positioned a counterweight 47. The flap 25 is arranged to be urged to a closed position by a weak spring arm 48 and to be opened by the pressure of the leading edge of a banknote. Thus, because in this embodiment the outlet shutter 25 is counterbalanced, it is immune to vibrations as discussed above.

As illustrated in FIG. 15, in this embodiment the counterweight is positioned on the opposite side of the axle 46 on which the shutter 25 pivots so that the center of gravity of the shutter and counterweight combination lies on the axle 46 (or close thereto). However, a more complex counterweighting arrangement as shown in the embodiment of FIGS. 11 to 13 could equally be employed.

This embodiment is advantageously combined with any of the foregoing embodiments, so that both the inlet flap and the outlet flap are counterbalanced. The arrangement is particularly suitable to be provided in a selector apparatus which can be used in either vertical orientation, since the positions of the effective centres of gravity of the inlet flap assembly and the outlet flap assembly are unchanged by turning the apparatus upside down. There are many applications where this may be desirable, for example, for reasons of space.

Fifth Embodiment

In the first described embodiment, a stacking piston 24 is provided to selectively load an accepted banknote into a cashbox.

Figure 16:
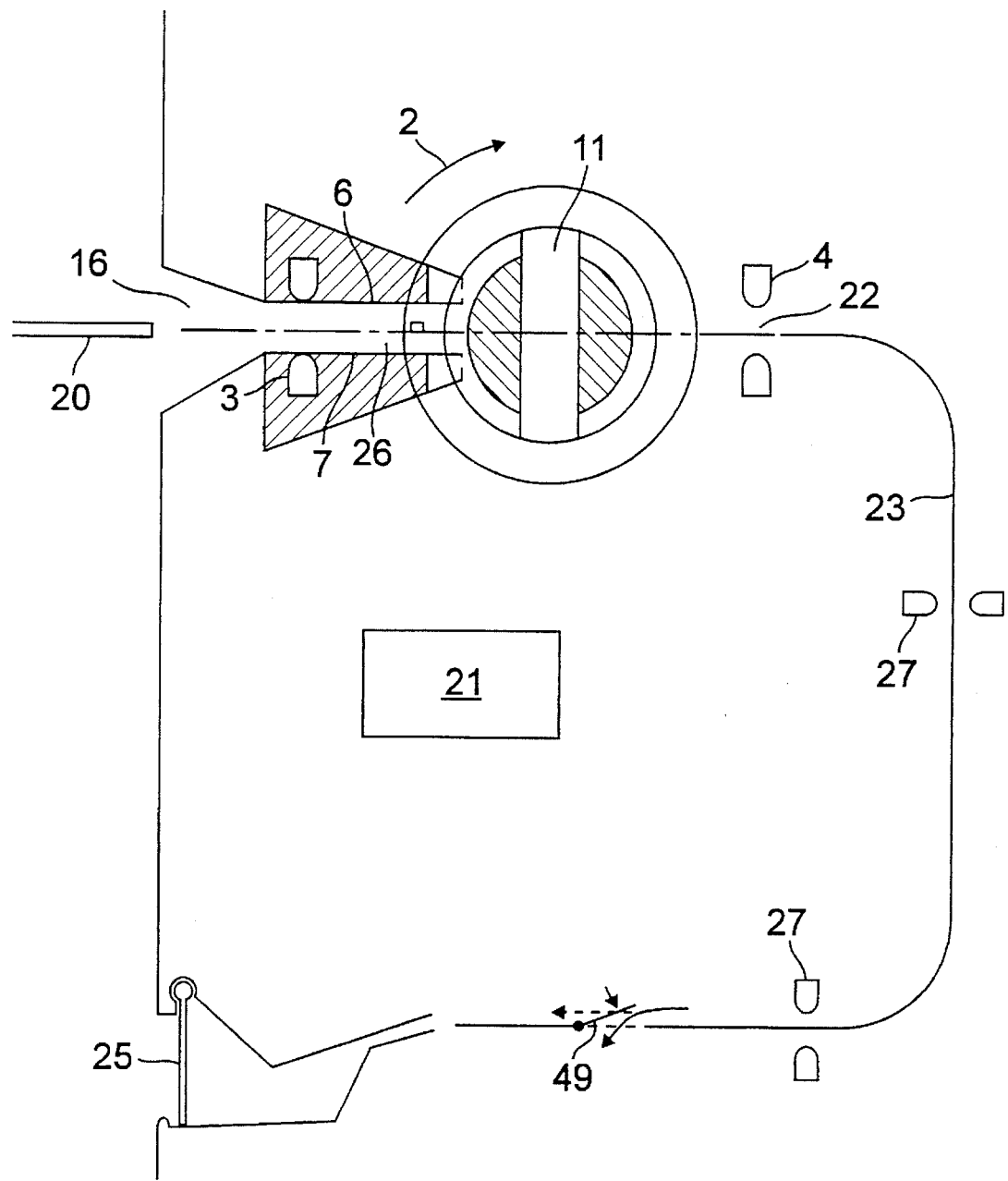
FIG. 16 corresponds generally to FIG. 1 and illustrates a diverter according to a fifth embodiment of the invention.

However, referring to FIG. 16, in this embodiment the stacking piston 24 is replaced by a diverter mechanism 49. The diverter mechanism is moveable between two positions; in a first ("closed") position it does not obstruct the path of a note towards the outlet shutter 25, whereas in a second ("open") position it blocks the passage to the outlet shutter 25 and instead diverts a note outwardly of the apparatus towards a cashbox or escrow.

Referring to FIG. 17, in this embodiment the diverter 49 comprises a generally plate shaped member extending across the width of the note path 23 and pivotable about an axle 50. The diverter 49 is pivoted by an actuator (not shown, but conveniently comprising a further solenoid acting against a biasing spring).

Positioned on the diverter 49 (shown on the other side of the axle 50 from the note engaging end of the diverter 49) is a counterweight 51 of a sufficient weight to position the centre of gravity of the diverter, including the counterweight 50 and the actuator, on the axis running through the axle 50.

When the diverter 49 is in the position shown, it blocks the passage of a note towards the outlet shutter 25, whereas when it is rotated in the direction 2, it presents a diverting surface permitting the note to pass on towards the outlet shutter 25. The diverter 49 is actuated by the control circuit 21 in response to a valid/invalid decision thereof, to either pass the note outwardly of the path 23 and to a note store or to reject the note through the outlet shutter 25.

In this embodiment, as in the above embodiments, improved resistance to vibration is provided and thus the chance that a note passing towards the outlet shutter 25 will become jammed as it passes the diverter 49 is reduced.

Conveniently, this embodiment is employed together with any of the foregoing embodiments.

Particularly preferably, the diverter 49 in this embodiment may be as described in our British patent application No. 9320167.1 filed on 30 Sep. 1993 and incorporated herein by reference.

Further embodiments

Figure 18:
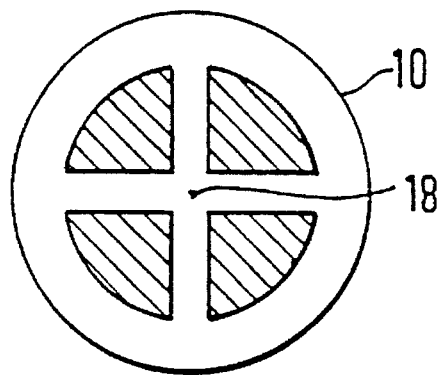
FIGS. 18 to 20 show other embodiment of the invention.
Figure 19:
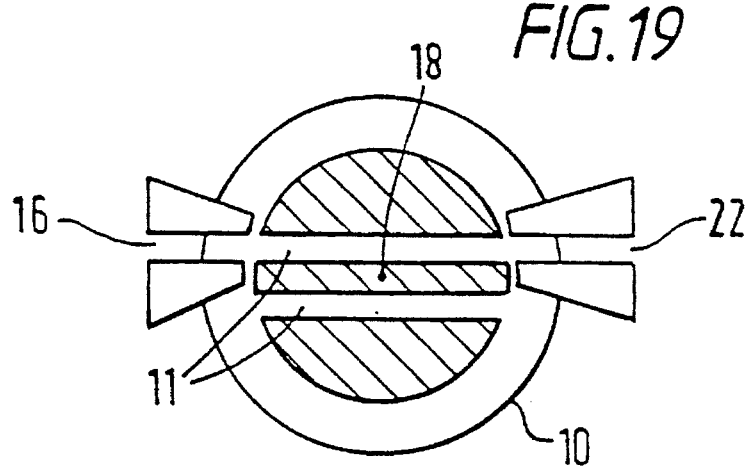
Figure 20:
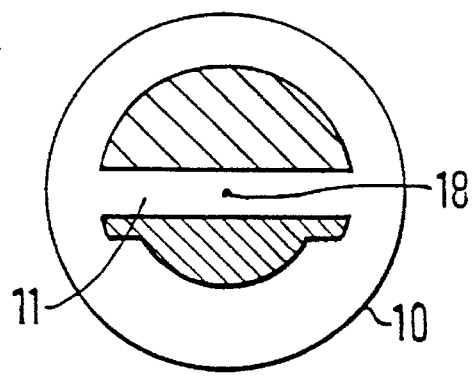

FIGS. 18, 19 and 20 show further exemplary embodiments of the shutter according to the invention, accompanied in each case by the diagrammatic representation of an encoder disc.

FIG. 18 shows an exemplary embodiment of the invention in which the shutter, made of a homogenous material of uniform volume mass, comprises two slots at 90° to each other. In this exemplary embodiment, rotation through an angle of 45° is sufficient to pass from the open position of the shutter to the closed position, and vice versa.

FIG. 19 shows an exemplary embodiment of the invention in which the shutter, likewise made of a homogeneous material of uniform volume mass, still comprises two slots, but parallel to each other. Also shown are the inlet channel and the inner part of the selector downstream of the shutter, to show that the axis of rotation of the shutter is not in this example situated in the plane of introduction of the document. In this exemplary embodiment, rotation through an angle of 90° is necessary to pass from the open position of the shutter to the closed position, and vice versa. Each slot is still traversed in the same direction by an incoming document, which makes it possible in this example to provide a venturi, or a guide means, or a non-return device, without thereby necessitating rotation through 360° between two open positions of the shunner.

FIG. 20 shows an exemplary embodiment of the invention in which the shutter has an asymmetrical shape in relation to its axis of rotation. This is possible, for example, by constructing the shutter in two parts produced from two different materials, on either side of the slot, the volume masses of the two materials being such that the centre of gravity of the assembly is nevertheless located on the axis of rotation. This exemplary embodiment shows that there is no limitation with regard to the external shapes of the shutter, which can meet other requirements without departing from the scope of the invention.

For example, where the invention is to turn through less than 360°, it may present a cross section corresponding only to a sector of a cylinder: e.g. where the invention is pivotable through 45°, it may have a cylindrical cross section over only 45° of its circumference.

I claim:

1. A shutter arrangement for a document handling apparatus, comprising:

a channel;

a shutter capable of obstructing the channel and pivotable about a pivot axis into or out of the plane of the document; and, an elongate actuating member extending away from the pivot axis and connected to the shutter so that actuation of the member pivots the shutter so as to define a moving assembly, wherein the mass of said moving assembly is so distributed that the assembly does not exhibit any turning moment about said pivot axis on vibration of the document handling apparatus to which the pivot axis is connected.

2. A shutter arrangement according to claim 1 in which the center of gravity of the arrangement is located on the pivot axis.

3. A shutter arrangement according to claim 1 further comprising a second pivot axis, and actuating means for actuating said shutter, said actuating means pivoting about said second pivot axis, further comprising a counterweight arrangement acting around said second axis to balance the mass of the assembly so that it exhibits no turning moment.

4. A shutter arrangement according to claim 1, in which said channel is an inlet channel to said document handling apparatus.

5. A shutter arrangement according to claim 1 in which said channel is an outlet channel leading to a document outlet of the document handling apparatus.

6. A shutter arrangement according to claim 1 in which the channel branches into a plurality of outlet branches, and the shutter comprises a diverter for selecting one of said outlet branches.

7. A shutter arrangement according to claim 1, comprising shutter drive means actuated by a control circuit acting in response to the action of one or more systems for detecting the presence of paper in order to close the shutter by actuation of the drive means.

8. A shutter arrangement according to claim 1, in which the shutter obstructs the channel over the whole of its width.

9. A shutter arrangement according to claim 1, in which the channel is equipped with features engageable with cooperating features provided in the shutter to prevent the document from passing round the shutter.

10. A shutter arrangement according to claim 1, in which the shutter has a shape resembling that of at least part of a cylinder of revolution about the axis, and wherein two slots approximately normal to each other are provided through the shutter to permit the passage of the document in at least one defined angular position of the device.

11. A shutter arrangement according to claim 10, in which the slots are symmetrical in relation to the axis.

12. A shutter arrangement according to claim 10, in which each slot comprises a flared inlet portion allowing the document to be guided into said slot.

13. A shutter arrangement according to claim 11, in which the shutter comprises two slots, preferably generally parallel to each other, the pivot axis being outside the plane of introduction of the document into the aperture.

14. A shutter arrangement according to claim 10, in which the shutter is produced in several parts consisting of materials of different density distributed at different distances from the pivot axis.

15. A shutter arrangement according to claim 1, in which the drive means of the device comprises an electromagnet.

16. A shutter arrangement according to claim 15 in which the shutter is in the closed position when the electromagnet is at rest.

17. A shutter arrangement according to claim 1 further comprising a processor, in which an outlet shutter controlled by the processor, allows a rejected document to leave the selector.

18. A shutter arrangement according to claim 1, further comprising means for generating optical or acoustic signals to inform the user regarding obstruction of the inlet channel.

19. A shutter arrangement comprising a shutter member including a passage through which a document can pass, said passage being alignable with a document transport passage of a document handling apparatus by pivoting the shutter assembly about the pivot axis, said shutter being located within a surround, wherein the surround and the shutter carry mutually interengaging features to prevent a flat document from passing between the shutter and the surround.

20. A shutter arrangement according to claim 19 in which the shutter comprises a rotationally symmetrical shutter.

21. A shutter arrangement according to claim 19 in which said features comprise castellation upon at least either said shutter or said surround.

22. A shutter arrangement for a document handling apparatus, comprising:

a channel;

a shutter capable of obstructing the channel and pivotable about a pivot axis into or out of the plane of the document;

an encoder disk connected to the shutter to move therewith for identifying at least four uniformly spaced positions of the shutter, wherein two of the positions correspond to the complete opening of the shutter and two others to its complete closure;

a processor electrically connected to the encoder which may, in response to the action of the encoder, order the rotation of the shutter; and, at least one further component arranged to move with the shutter so as to define a moving assembly, wherein the mass of said moving assembly is so distributed that the assembly does not exhibit any turning moment about said pivot axis on vibration of the document handling apparatus to which the pivot axis is connected.

23. A shutter arrangement according to claim 22, comprising means for detecting stress on the device other than that which is applied to it by its drive means.

* * * * *

UNITED STATES PATENT AND TRADEMARK OFFICE
CERTIFICATE OF CORRECTION

Page 1 of 2

PATENT NO.   : 5,577,589
DATED        : November 26, 1996
INVENTOR(S)  : Jaime G. Garcia Tinoco It is certified that error appears in the above-indentified patent and that said Letters Patent is hereby corrected as shown below:

| | | |
|---|---|---|
| Col. 3,  | line 20, | cancel "o" and insert --of--. |
| Col. 3,  | line 58, | cancel "no" and insert --to--. |
| Col. 3,  | line 62, | cancel "no" and insert --to--. |
| Col. 4,  | line 2,  | cancel "in" and insert --it--. |
| Col. 6,  | line 12, | after "of", insert --the--. |
| Col. 7,  | line 53, | cancel "slot 1" and insert --slot 11--. |
| Col. 8,  | line 60, | cancel "sane" and insert --state--. |
| Col. 8,  | line 65, | cancel "free in" and insert --free. In--. |
| Col. 10, | line 3,  | cancel "he" and substitute --the--. |
| Col. 12, | line 37, | cancel "sabilised" and substitute --stabilized--. |
| Col. 15, | line 12, | (Claim 3) after "comprising", insert --:--. |

UNITED STATES PATENT AND TRADEMARK OFFICE
CERTIFICATE OF CORRECTION

PATENT NO. : 5,577,589
DATED : November 26, 1996
INVENTOR(S) : Jaime G. Garcia Tinoco It is certified that error appears in the above-indentified patent and that said Letters Patent is hereby corrected as shown below:

Col. 15, line 50, (Claim 13) cancel "claim 11" and substitute --claim 10--.

Signed and Sealed this

Twenty-sixth Day of August, 1997

Attest:

BRUCE LEHMAN

Attesting Officer

Commissioner of Patents and Trademarks